A. C. MURPHY.
VALVE.
APPLICATION FILED DEC. 18, 1911.
1,081,322.
Patented Dec. 16, 1913.
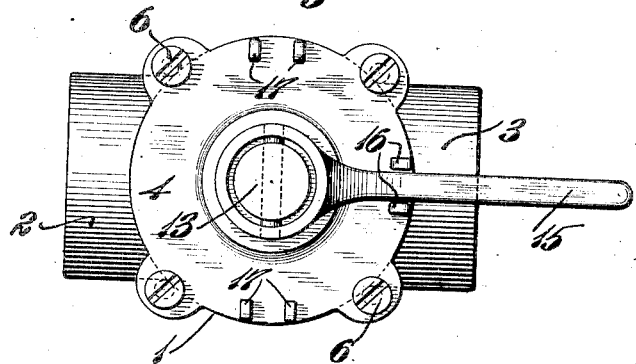
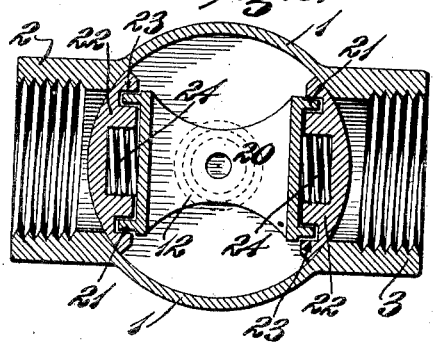
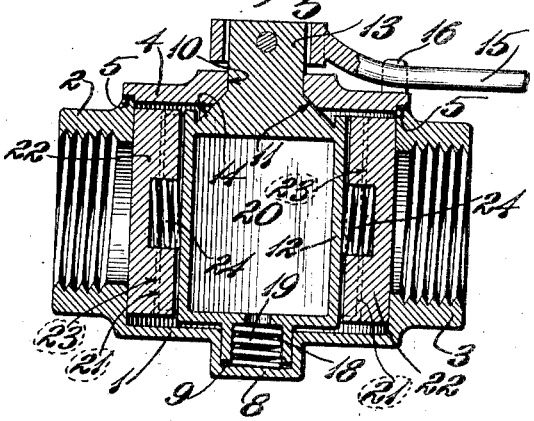
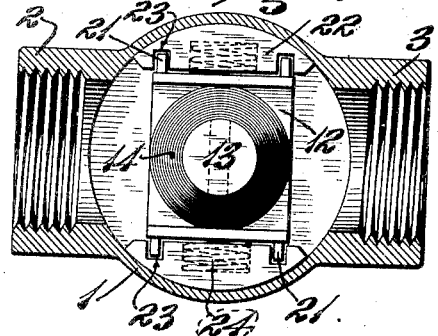
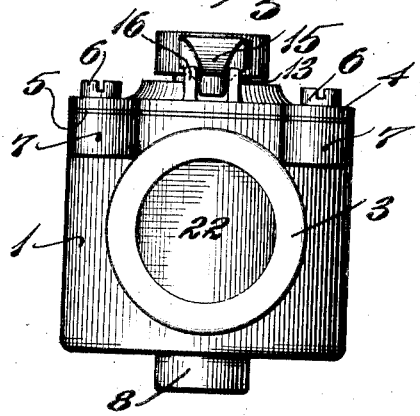
Witnesses:
Edgar T. Farmer
A. W. Holcombe
Inventor:
Albert C. Murphy,
By Cannot Cause,
his Attys.

UNITED STATES PATENT OFFICE.

ALBERT C. MURPHY, OF NEW YORK, N. Y.

VALVE.

1,081,322.

Specification of Letters Patent. Patented Dec. 16, 1913.

Application filed December 18, 1911. Serial No. 666,506.

*To all whom it may concern:*

Be it known that I, ALBERT C. MURPHY, a citizen of the United States, and a resident of the city, county, and State of New York, have invented a new and useful Improvement in Valves, of which the following is a specification.

My invention relates to rotary gate valves for stopping the flow of fluid through a train pipe, and comprises a casing adapted to be coupled up either way in a length of pipe and having a cylindrical chamber arranged transversely to the direction of flow through the pipe, in which chamber is a rotary shut off valve having two closed positions separated by a half turn, a quarter turn of the valve either way from closed position opening the full passage through the chamber.

The objects of my invention are to provide a valve that will remain in full open or closed position, and that shall show at a glance whether it is open or closed; to provide a valve having a straight clear passage through it when opened the same diameter as that of the pipe or inlet, so that there may be practically no friction and no wire drawing of the fluid passing through; to provide a valve that will remain tight regardless of the wear of the bearing surfaces; to provide a valve that will be equally tight under high pressure as under low pressure; to provide a valve that will operate equally well in either direction of flow of the fluid; and to provide a valve that is self cleaning.

Other objects of my invention will appear in connection with the following description of the embodiment thereof illustrated in the accompanying drawings forming a part of this application, and will be more particularly pointed out in the appended claims.

In the drawings, in which like characters represent like parts throughout the several views,—Figure 1 is a top plan view of my improved device; Fig. 2 is a vertical longitudinal section thereof; Fig. 3 is a horizontal longitudinal section thereof showing the valve in closed position; Fig. 4 is a view similar to Fig. 3 showing the valve in plan view in open position; and Fig. 5 is an end elevation of the device.

My device comprises a casing 1 substantially cylindrical in form, and provided with connections 2, 3 threaded internally to receive the threaded ends of the pipe in which the valve is placed, as for example in a steam or air brake train pipe. This casing is open at the top and fitted with a cover 4, grooved around the periphery of its lower face to provide a seat for a gasket 5, and secured by means of screws 6 passing through the cover and gasket into threaded holes in the lugs 7 on the casing.

The bottom wall of the casing is formed with a central boss 8, cylindrical in shape. The inside of the casing is finished all over, to the form of a cylindrical chamber, the boss 8 forming a cylindrical socket 9 in the bottom of the chamber. The cover 4 has a central opening 10, beveled at its under edge at 11. The socket 9 and hole 10 are in axial alinement, and form bearings for the valve member rotatably mounted therein. The valve member comprises a hollow post 12, the top of which is solid and has a cylindrical extension or stem 13 projecting through the cover and formed with a conical shoulder or plug 14 fitting against the beveled edge 11 of the hole in the cover to make a tight joint. The end of the stem 13 is provided with a handle 15 pivotally mounted thereon.

Lugs 16, 17, on the top of the cover between which the handle 15 is adapted to lie, serve to retain the valve post in fixed rotative position in the casing at any one of the three points a quarter turn apart. The lower end of the valve post is cylindrical, fitting in the cylindrical socket 9 in the chamber. The bottom of the valve post has an axial bore extending through it, and is provided with an annular recess 18 in which a coil spring 19 is arranged to bear against the casing and post to keep the shoulder 14 of the latter in contact with the beveled edge 11 forming a seat therefor in the cover. The greater part of the valve post 12 is in the form of a yoke having a central passage 20 straight through it from side to side so that in the open position of the valve a clear opening between the pipe connections of greater area than the cross section of the pipes is provided. The sides of the yoke adjacent the opening are straight and provided with marginal flanges 21 longitudinally thereof. Valve segments 22 having longitudinal grooves 23 along their back edges loosely fitting the flanges 21 on the valve post are arranged between the valve post and the inside of the casing, the front sides of these segments being finished to fit snugly within the casing. These segments are recessed on their back sides and coil springs 24 inserted therein to bear against the valve post and segments and press the latter against the inside wall of the casing.

In the operation of my device it should be coupled in a horizontal pipe, with the valve post vertical, the handle being on top. In this position the valve is locked in open or shut condition by the handle 15 coöperating with the lugs 16, 17, on the cover, and an inspection of the position of the handle is enough to show whether the valve is open or closed. In the open position of the valve, the greater the pressure on the pipe the tighter will the joint between the cover and valve stem be, as the fluid pressure on the under surface of the solid stem portion aids the spring in holding the conical shoulder 14 against the beveled edge 11. The springs 24, acting on the valve segments, hold these parts in close contact with the wall of the casing in both open and closed positions, thus preventing dirt from finding its way between the segments and the inside of the casing. With the valve in closed position the pressure in the pipe, whichever way the flow may be, will force the adjacent valve segment back against the springs 24 and so the valve chamber will be filled. The pressure in the chamber will aid the spring behind the opposite valve segment to keep that segment closed, and the greater the fluid pressure, the greater will be the pressure tending to hold this valve segment on its seat. Thus whichever way the flow is, the valve will be tight in closed position. On opening the valve, any dirt or sediment collected in the chamber will be blown out through the pipe. By turning the valve in the reverse direction through a half turn the chamber can be thoroughly cleaned of dirt, as whatever dirt might lodge behind the corners of the valve segments in the first position will be blown through when the position is reversed. Thus the valve is self cleaning.

The loose connection between the valve post and the valve segments enables the latter to accommodate themselves to any slight irregularities in the fit of the parts in the casing and at all times have an even bearing therein. Any unevenness in the wear of the parts is thus taken care of, and the valve does not get leaky in service.

While I am aware that rotary valves having spring pressed parts have been known and used prior to my invention these valves as heretofore constructed are not adapted to meet the varying conditions of service to which my invention is applicable.

What I claim and desire to secure by Letters Patent is as follows:

1. In a train pipe valve, a valve casing having cylindrical walls formed with interchangeable inlet and outlet ports, a reversible rotary valve therein, said valve comprising a yoke having two branches forming a passage for fluid between them and a spring-pressed parti-cylindrical valve segment loosely carried by each branch of said yoke, said yoke having its ends journaled in said casing, one end being solid and having a short stem projecting through said casing and being provided with an annular shoulder bearing against a seat in the casing, and the other end having an axial bore communicating with said passage and formed with an annular recess at its extremity, a spring in said recess bearing against the casing, and external means coöperating with said casing for positioning said valve in open, closed and reversed positions.

2. In a train pipe valve, a cylindrical casing forming a valve chamber and having interchangeable inlet and outlet ports in its side wall diametrically opposite each other, said casing being formed with a closed bottom having a cylindrical recess axially disposed therein, a cover for the top of said casing, said cover having a flush inner face with a countersunk seat therein surrounding a central hole for the valve stem, a rotatable valve axially arranged in said casing, said valve comprising a yoke and spring positioned valve segments loosely mounted thereon, the upper end of said yoke extending through the hole in said cover and having a beveled shoulder seated in the countersunk seat therein, the lower end of said yoke being journaled in the recess in the bottom of said casing and having a hollow bore therein, a spring positioned within said hollow bore and bearing against the bottom of said casing to maintain said yoke with its beveled shoulder against its seat in said cover, and means for admitting fluid pressure from said valve chamber to said recess whereby said fluid pressure will assist in maintaining said beveled shoulder in contact with its seat in said cover and one of said valve segments tight against the outlet port.

Signed at Montreal, Canada, this 13 day of Dec., 1911.

ALBERT C. MURPHY.

Witnesses:
CHARLES ISAACS,
ROBT. E. POWERS.